United States Patent
Ishii

(10) Patent No.: US 9,592,854 B2
(45) Date of Patent: Mar. 14, 2017

(54) VEHICLE FRONT PORTION STRUCTURE

(71) Applicant: TOYOTA JIDOSHA KABUSHIKI KAISHA, Toyota-shi (JP)

(72) Inventor: Naoyuki Ishii, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/003,102

(22) Filed: Jan. 21, 2016

(65) Prior Publication Data

US 2016/0236716 A1 Aug. 18, 2016

(30) Foreign Application Priority Data

Feb. 13, 2015 (JP) .................................. 2015-026701

(51) Int. Cl.
   B62D 21/15 (2006.01)
(52) U.S. Cl.
   CPC .................................. B62D 21/155 (2013.01)
(58) Field of Classification Search
   CPC .... B62D 21/11; B62D 21/155; B62D 21/152; B62D 21/15; B60G 7/02; B60G 2200/14; B60G 2204/143; B60G 2204/4302
   See application file for complete search history.

(56) References Cited

U.S. PATENT DOCUMENTS

| | | | | |
|---|---|---|---|---|
| 5,251,932 A * | 10/1993 | Ide | .................... | B60G 21/0551 180/427 |
| 6,209,948 B1 * | 4/2001 | Mori | .................... | B62D 21/152 296/187.09 |
| 6,758,516 B1 * | 7/2004 | Abramczyk | ......... | B62D 21/157 296/187.12 |
| 8,393,669 B2 * | 3/2013 | Ajisaka | .................. | B62D 21/06 296/187.09 |
| 9,399,487 B2 * | 7/2016 | Fujita | .................... | B62D 21/11 |
| 2003/0094803 A1 * | 5/2003 | Fujiki | .................. | B62D 21/155 280/784 |
| 2003/0141712 A1 * | 7/2003 | Miyasaka | ............... | B60R 19/00 280/784 |
| 2010/0194145 A1 * | 8/2010 | Akaki | .................... | B62D 21/09 296/187.08 |
| 2015/0329143 A1 * | 11/2015 | Fujita | .................... | B62D 21/11 280/784 |
| 2016/0288837 A1 * | 10/2016 | Sagara | ................. | B62D 21/155 |

FOREIGN PATENT DOCUMENTS

JP        2004-9893        1/2004

* cited by examiner

*Primary Examiner* — Drew Brown
(74) *Attorney, Agent, or Firm* — Oblon, McClelland, Maier & Neustadt, L.L.P.

(57) ABSTRACT

There is provided a vehicle front portion structure including (1) a suspension member having (i) a front cross member and a rear cross member, and (ii) a side rail that couples vehicle width direction outside end portions of the front cross member and the rear cross member, (2) a lower arm whose vehicle width direction outside end portion is coupled to a front wheel and whose vehicle width direction inside end portion is coupled at least to a front side coupling portion and a rear side coupling portion of the suspension member, and (3) a weak portion that is formed in the front cross member on the vehicle width direction inside of a coupling point at which the lower arm and the front side coupling portion are coupled to each other and that is to be broken by a load input from the vehicle body front side.

6 Claims, 9 Drawing Sheets

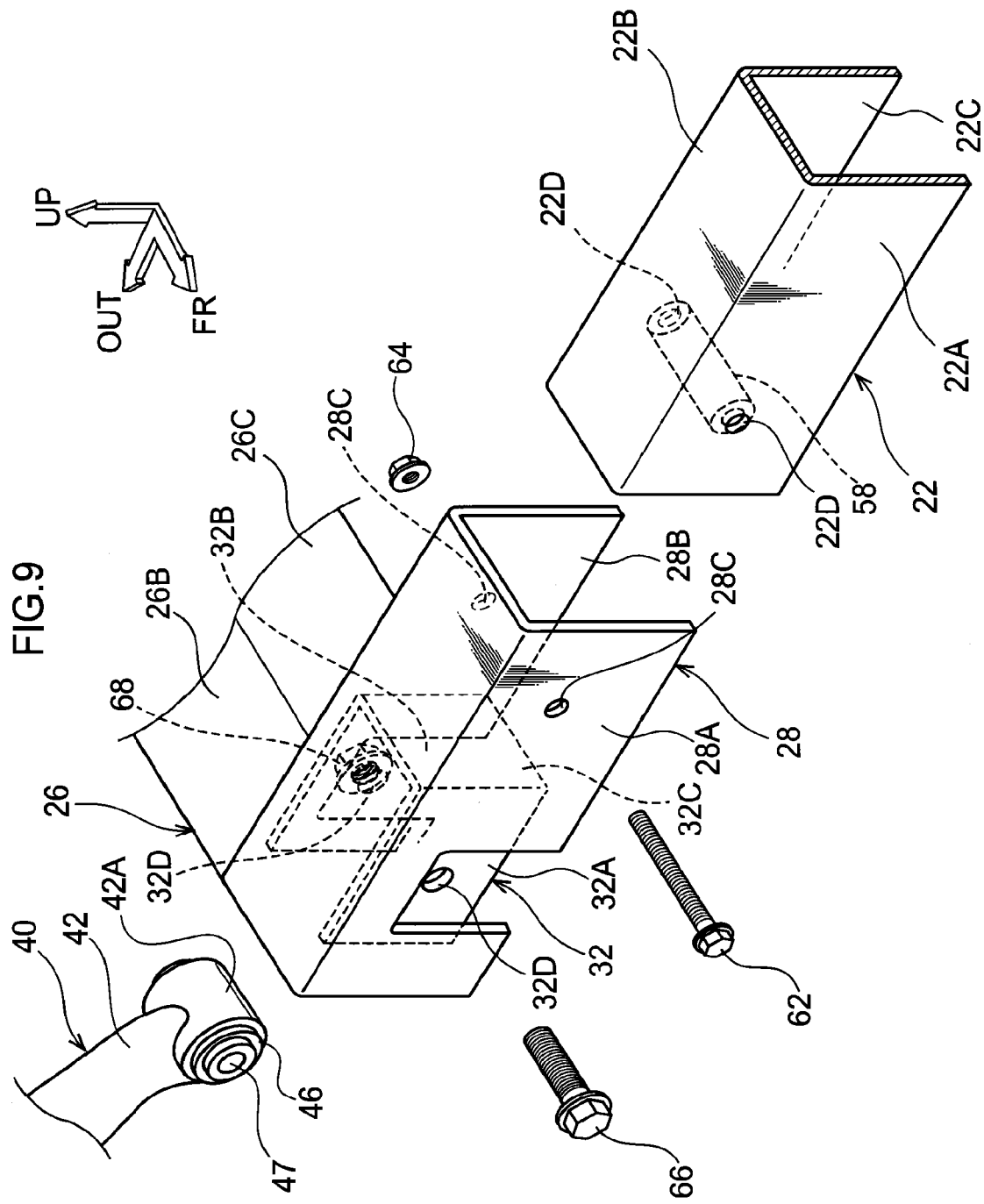

VEHICLE FRONT PORTION STRUCTURE

CROSS-REFERENCE TO RELATED APPLICATION

This application claims priority under 35 USC 119 from Japanese Patent Application No. 2015-026701 filed on Feb. 13, 2015, the disclosure of which is incorporated by reference herein.

BACKGROUND

Technical Field

The present disclosure relates to a vehicle front portion structure.

Related Art

A vehicle front portion structure has conventionally been known where an energy absorption portion to which a load is input during the initial stage of a crash is disposed in a front connection position between a sub-frame and a suspension arm (a lower arm) to allow a front wheel to turn outward at the time of a crash (e.g., see Japanese Patent Application Laid-open (JP-A) No. 2004-9893).

However, in order to keep the front wheel from approaching the cabin side at the time of a small overlap crash in which the vehicle is involved in a frontal crash on the vehicle width direction outside of a front side member, it is necessary to allow the front wheel to become detached from the lower arm during the initial stage (early stage) of the crash. Structures that make it easier for the front wheel to be detached at an early stage from the lower frame at the time of a small overlap crash in this way still have room for improvement.

SUMMARY

Thus, the present disclosure obtains a vehicle front portion structure that can make it easier for the front wheel to be detached at an early stage from the lower arm at the time of a small overlap crash.

A first aspect of the present disclosure is a vehicle front portion structure including: a suspension member having a front cross member and a rear cross member that extend in a vehicle width direction, and a side rail that extends in a vehicle body front and rear direction and couples a vehicle width direction outside end portion of the front cross member and a vehicle width direction outside end portion of the rear cross member to each other; a lower arm whose vehicle width direction outside end portion is coupled to a front wheel and whose vehicle width direction inside end portion is coupled at least to a front side coupling portion and a rear side coupling portion of the suspension member; and a weak portion that is formed in the front cross member on the vehicle width direction inside of a coupling point at which the lower arm and the front side coupling portion are coupled to each other and that is to be broken by a load input from the vehicle body front side.

According to the first aspect, when a load is input from the vehicle body front side such as, for example, when the vehicle is involved in a small overlap crash with a barrier, the weak portion formed in the front cross member becomes broken. Consequently, when the load is input from the vehicle body front side, toe out, in which the rear portion side of the front wheel turns inward in the vehicle width direction, is suppressed compared to a configuration where the lower arm becomes detached from the front side coupling portion.

Thus, the rear end portion of the front wheel whose front end portion has collided with the barrier collides with the rocker, and a reaction force heading from the rocker toward the vehicle body front side is obtained. Because of this, a load in the opposite direction relatively in the vehicle body front and rear direction acts between the front wheel and the lower arm, and it becomes easier for the front wheel to be detached at an early stage from the lower arm.

A second aspect of the present disclosure is the vehicle front portion structure pertaining to the first aspect, wherein the weak portion is formed at least in a front wall of the front cross member that faces the vehicle body front side.

According to the second aspect, the weak portion is formed at least in the front wall of the front cross member that faces the vehicle body front side. Consequently, when a load is input from the vehicle body front side such as, for example, when the vehicle is involved in a small overlap crash, it becomes easier for the weak portion to be broken.

A third aspect of the present disclosure is the vehicle front portion structure pertaining to the first aspect or the second aspect, wherein the weak portion is a recessed bead portion.

According to the third aspect, the weak portion is a recessed bead portion. Consequently, when a load is input from the vehicle body front side such as, for example, when the vehicle is involved in a small overlap crash, the breaking of the weak portion is effectively promoted with a simple structure.

A fourth aspect of the present disclosure is the vehicle front portion structure pertaining to the first aspect or the second aspect, wherein the weak portion is an open portion.

According to the fourth aspect, the weak portion is an open portion. Consequently, when a load is input from the vehicle body front side such as, for example, when the vehicle is involved in a small overlap crash, the breaking of the weak portion is effectively promoted with a simple structure.

A fifth aspect of the present disclosure is the vehicle front portion structure pertaining to the first aspect or the second aspect, wherein the weak portion is a cutout portion.

According to the fifth aspect, the weak portion is a cutout portion. Consequently, when a load is input from the vehicle body front side such as, for example, when the vehicle is involved in a small overlap crash, the breaking of the weak portion is effectively promoted with a simple structure.

A sixth aspect of the present disclosure is the vehicle front portion structure pertaining to the first aspect, wherein the weak portion is configured by making the coupling strength with which the vehicle width direction outside end portion of the front cross member and the side rail are coupled to each other smaller than the coupling strength with which the lower arm is coupled to the front side coupling portion.

According to the sixth aspect, the weak portion is configured by making the coupling strength with which the vehicle width direction outside end portion of the front cross member and the side rail are coupled to each other smaller than the coupling strength with which the lower arm is coupled to the front side coupling portion. Consequently, when a load is input from the vehicle body front side such as, for example, when the vehicle is involved in a small overlap crash, the coupling point (the weak portion) at which the vehicle width direction outside end portion of the front cross member and the side rail are coupled to each other becomes broken before the coupling point at which the lower arm is coupled to the front side coupling portion, and the breaking thereof is effectively promoted.

According to the first aspect, it can be made easier for the front wheel to be detached at an early stage from the lower arm at the time of a small overlap crash.

According to the second aspect, it can be made easier for the weak portion to break at the time of a small overlap crash.

According to the third to fifth aspects, the breaking of the weak portion can be effectively promoted with a simple structure at the time of a small overlap crash.

According to the sixth aspect, at the time of a small overlap crash the coupling point (the weak portion) at which the vehicle width direction outside end portion of the front cross member and the side rail are coupled to each other can be allowed to break before the coupling point at which the lower arm is coupled to the front side coupling portion, and the breaking thereof can be effectively promoted.

BRIEF DESCRIPTION OF THE DRAWINGS

Exemplary embodiments of the present disclosure will be described in detail based on the following figures, wherein:

FIG. 9 is an exploded perspective view showing the configuration of the weak portion of the vehicle front portion structure pertaining to the fourth embodiment.

DETAILED DESCRIPTION

Figure 1:
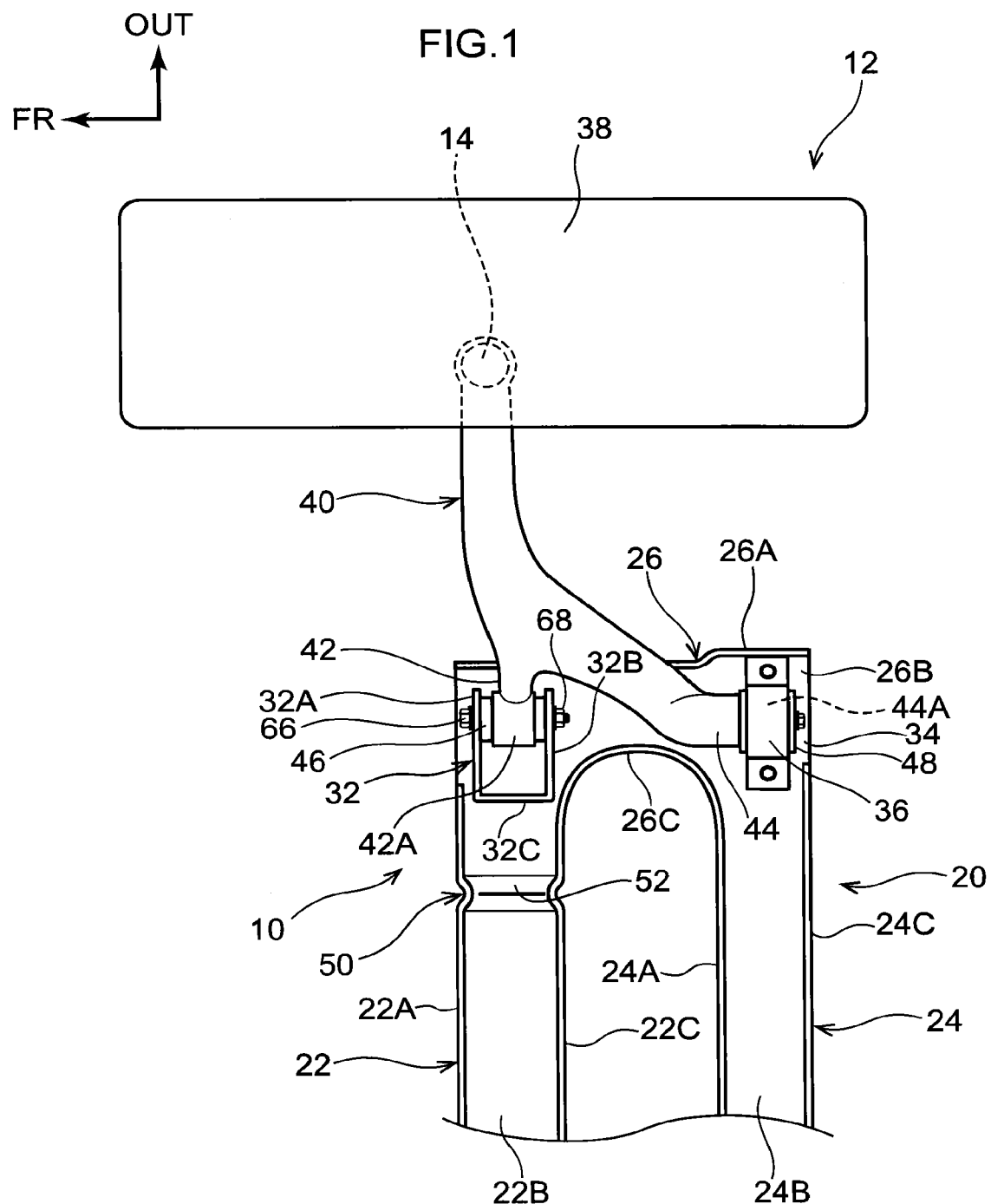
FIG. 1 is a bottom view showing a vehicle front portion structure pertaining to a first embodiment.

Embodiments pertaining to the present disclosure will be described in detail below on the basis of the drawings. It should be noted that in the drawings arrow UP indicates a vehicle body upward direction, arrow FR indicates a vehicle body forward direction, and arrow OUT indicates an outward direction in a vehicle width direction. Furthermore, when the directions of front and rear, up and down, and right and left are used without further specification in the following description, these will be understood to mean front and rear in a vehicle body front and rear direction, up and down in a vehicle body vertical direction, and right and left in a vehicle body right and left direction (vehicle width direction). Moreover, a vehicle front portion structure 10 pertaining to the embodiments is formed in such a way as to be bilaterally symmetrical.

First Embodiment

First, the vehicle front portion structure 10 pertaining to a first embodiment will be described. As shown in FIG. 1, a suspension member 20 is disposed on the underside of a front portion of a vehicle 12. The suspension member 20 has a front cross member 22 and a rear cross member 24, each of which is formed in a cross-sectionally substantially inverted U-shape that opens downward and which extend in the vehicle width direction, and a pair of right and left side rails 26, each of which is formed in a cross-sectionally substantially inverted U-shape that opens downward and which extend in the vehicle body front and rear direction.

That is, the front cross member 22 has a front wall 22A that faces the vehicle body front side, an upper wall 22B that faces the vehicle body upper side, and a rear wall 22C that faces the vehicle body rear side. The rear cross member 24 also has a front wall 24A that faces the vehicle body front side, an upper wall 24B that faces the vehicle body upper side, and a rear wall 24C that faces the vehicle body rear side. Each of the side rails 26 has an outer wall 26A that faces outward in the vehicle width direction at a height that does not interfere with a lower arm 40 described later, an upper wall 26B that faces the vehicle body upper side, and an inner wall 26C that faces inward in the vehicle width direction.

Additionally, both vehicle width direction outside end portions of the front cross member 22 and both vehicle width direction outside end portions of the rear cross member 24 are integrally coupled to each other by the side rails 26. It should be noted that the suspension member 20 may also be given a configuration where, like in a fourth embodiment described later, both vehicle width direction outside end portions of the front cross member 22 and both vehicle width direction outside end portions of the rear cross member 24 are coupled as a result of being fastened with bolts, for example, to the front end portions and the rear end portions of the side rails 26.

Furthermore, flat plate-shaped lower arms (suspension arms) 40 that support front wheels 38 are attached to the vehicle width direction outsides of the suspension member 20. The vehicle width direction inside of each of the lower arms 40 forks into a front side arm 42 and a rear side arm 44, and the front side arm 42 and the rear side arm 44 are coupled to a front side coupling portion 32 and a rear side coupling portion 34, respectively, of the suspension member 20.

Specifically, the vehicle width direction inside end portion of the front side arm 42 is formed as a hollow cylinder portion 42A whose axial direction coincides with the vehicle body front and rear direction, and a hollow cylinder-like rubber bush 46 and a collar member 47 (see FIG. 9) are coaxially disposed inside the hollow cylinder portion 42A. Additionally, the vehicle width direction inside end portion of the rear side arm 44 is also formed as a hollow cylinder portion 44A whose axial direction coincides with the vehicle body front and rear direction, and a hollow cylinder-like rubber bush 48 is disposed inside the hollow cylinder portion 44A.

The front side coupling portion 32 is, as seen in a bottom view, formed in a substantially U-shape whose open side faces outward in the vehicle width direction, and the front side coupling portion 32 is fixedly attached by welding, for example, to the inner surface of the upper wall 26B in the front end portion of the side rail 26. Additionally, through holes 32D (see FIG. 9) running in the vehicle body front and rear direction are formed in a front wall 32A and a rear wall 32B of the front side coupling portion 32.

Consequently, the front side arm 42 is rotatably fastened to the front side coupling portion 32 as a result of the hollow cylinder portion 42A thereof being inserted from the vehicle body lower side into the front side coupling portion 32 and a bolt 66 being passed from the vehicle body front side through the through hole 32D in the front wall 32A, a through hole (not shown in the drawings) in the collar member 47, and the through hole 32D in the rear wall 32B and screwed into a nut 68.

The rear side coupling portion 34 is the inner surface of the upper wall 26B in the rear end portion of the side rail 26 and has a cross-sectionally U-shaped bracket 36 that is fastened from the vehicle body lower side to the inner surface of the upper wall 26B. Consequently, the rear side arm 44 is secured to the rear side coupling portion 34 as a result of the hollow cylinder portion 44A thereof being placed from the vehicle body lower side on the rear side coupling portion 34 and held from the vehicle body lower side by the bracket 36 fastened to the upper wall 26B of the side rail 26.

Figure 2:
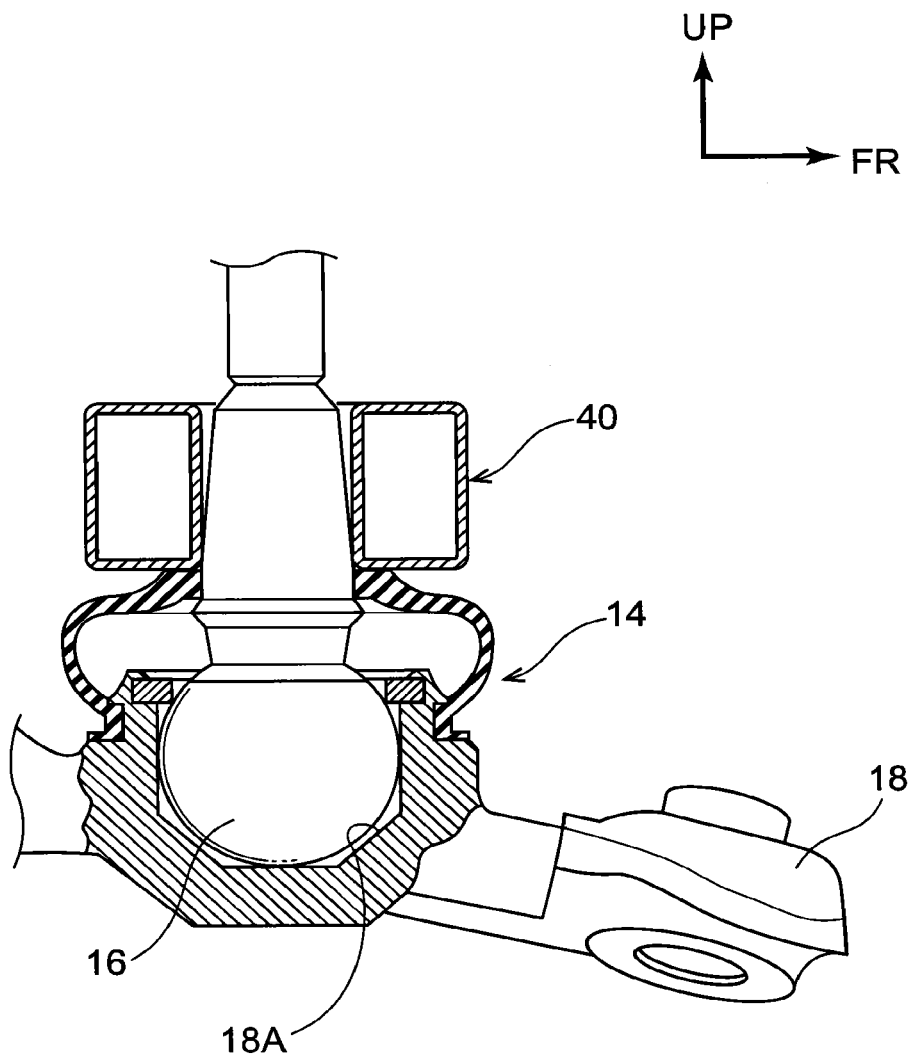
FIG. 2 is a side sectional view showing the configuration of a joint portion at which a lower arm and a front wheel are coupled to each other.

Furthermore, as shown in FIG. 2, the front wheel 38 is coupled via a joint portion 14 to the vehicle width direction outside end portion of the lower arm 40. The joint portion 14 has a ball joint 16 vertically installed in the vehicle width direction outside end portion of the lower arm 40, and the ball joint 16 is fitted into a recess portion 18A of a knuckle arm 18 disposed on the vehicle width direction inside of the front wheel 38.

Figure 4:
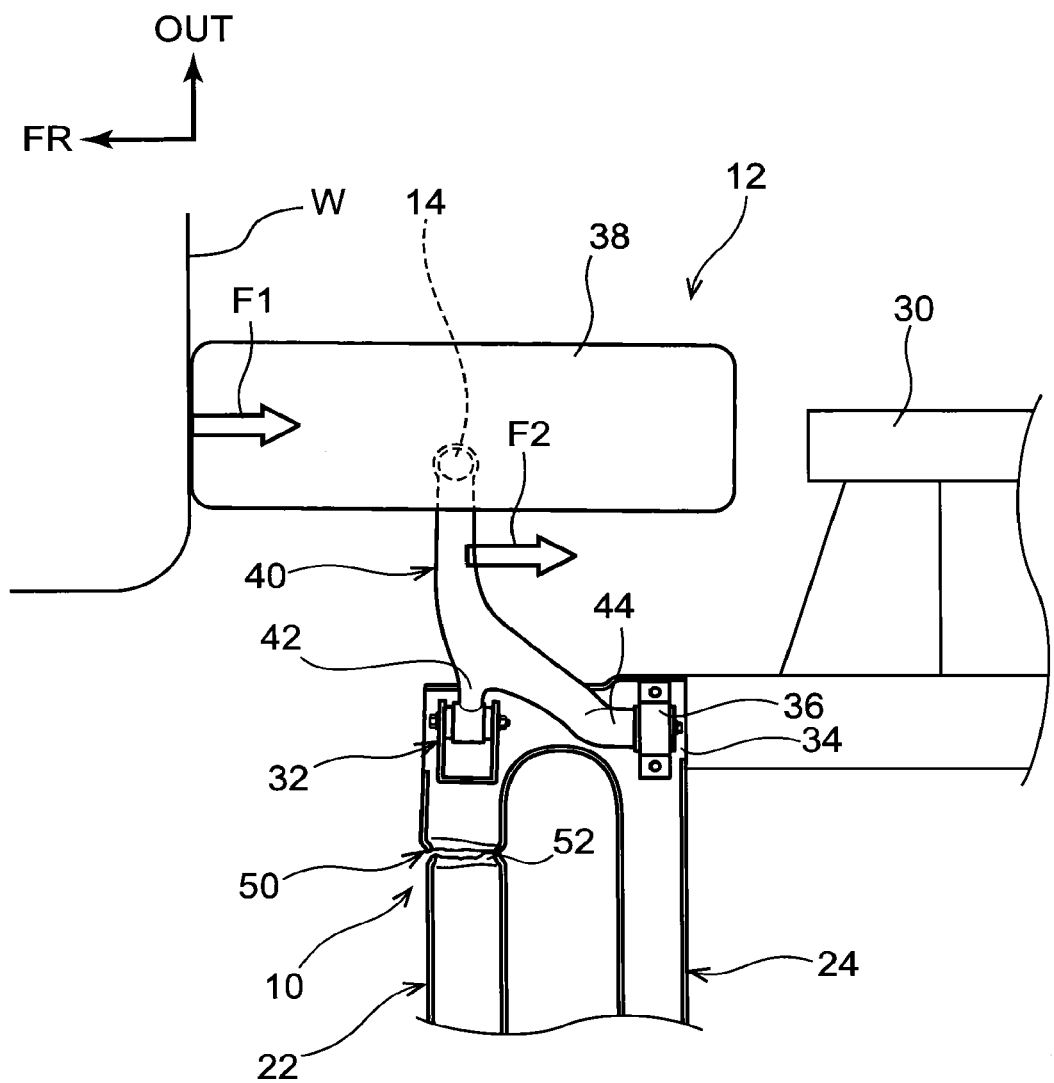
FIG. 4 is a bottom view showing a state at the time of a small overlap crash of a vehicle equipped with the vehicle front portion structure pertaining to the first embodiment.
Figure 5:
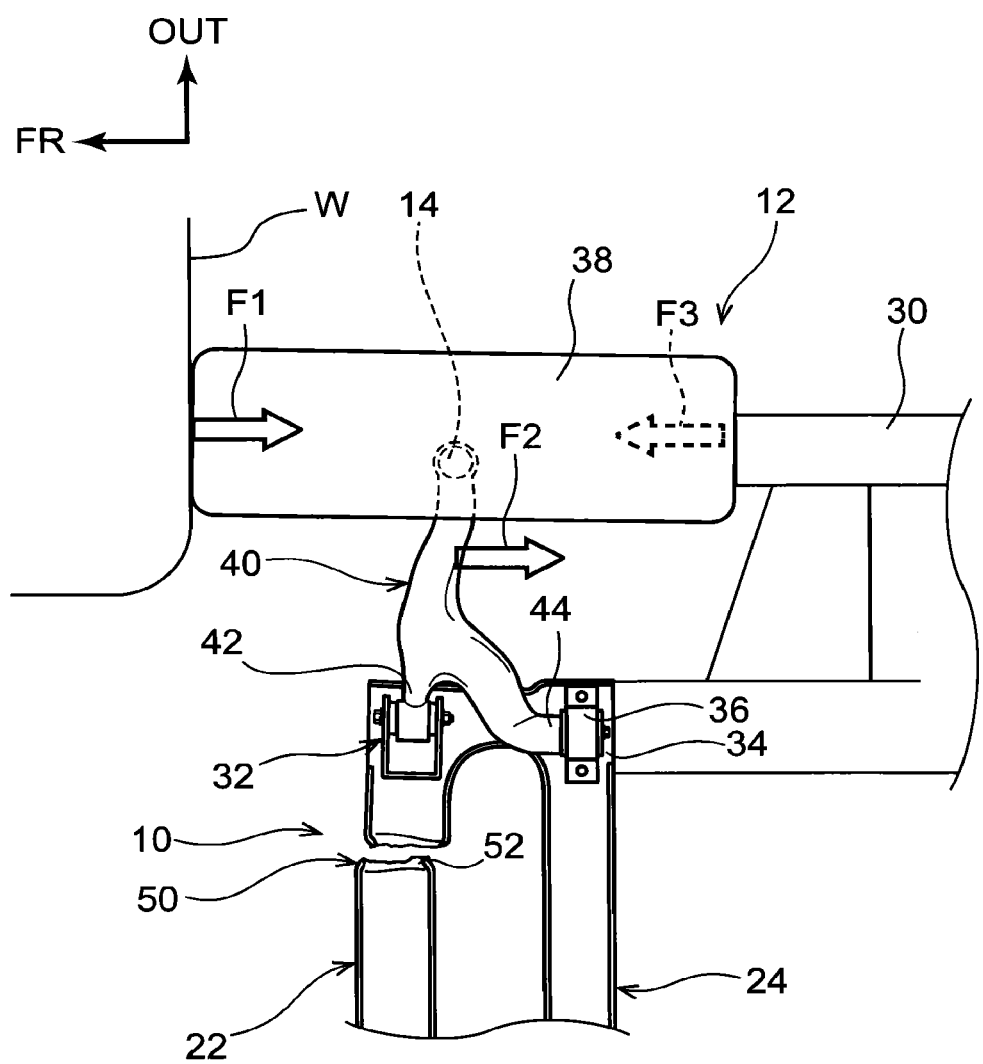
FIG. 5 is a bottom view showing a state after the small overlap crash of the vehicle equipped with the vehicle front portion structure pertaining to the first embodiment.

It should be noted that, as shown in FIG. 4 and FIG. 5, a rocker 30 that has a closed cross-sectional shape and extends in the vehicle body front and rear direction is disposed on the vehicle body rear side of the front wheel 38. Furthermore, as shown in FIG. 1, a weak portion 50 that becomes broken by a load input from the vehicle body front side is formed in the front cross member 22 on the vehicle width direction inside of a coupling point (in the present embodiment, an inner wall 32C of the front side coupling portion 32) at which the lower arm 40 is coupled to the front side coupling portion 32.

Figure 3:
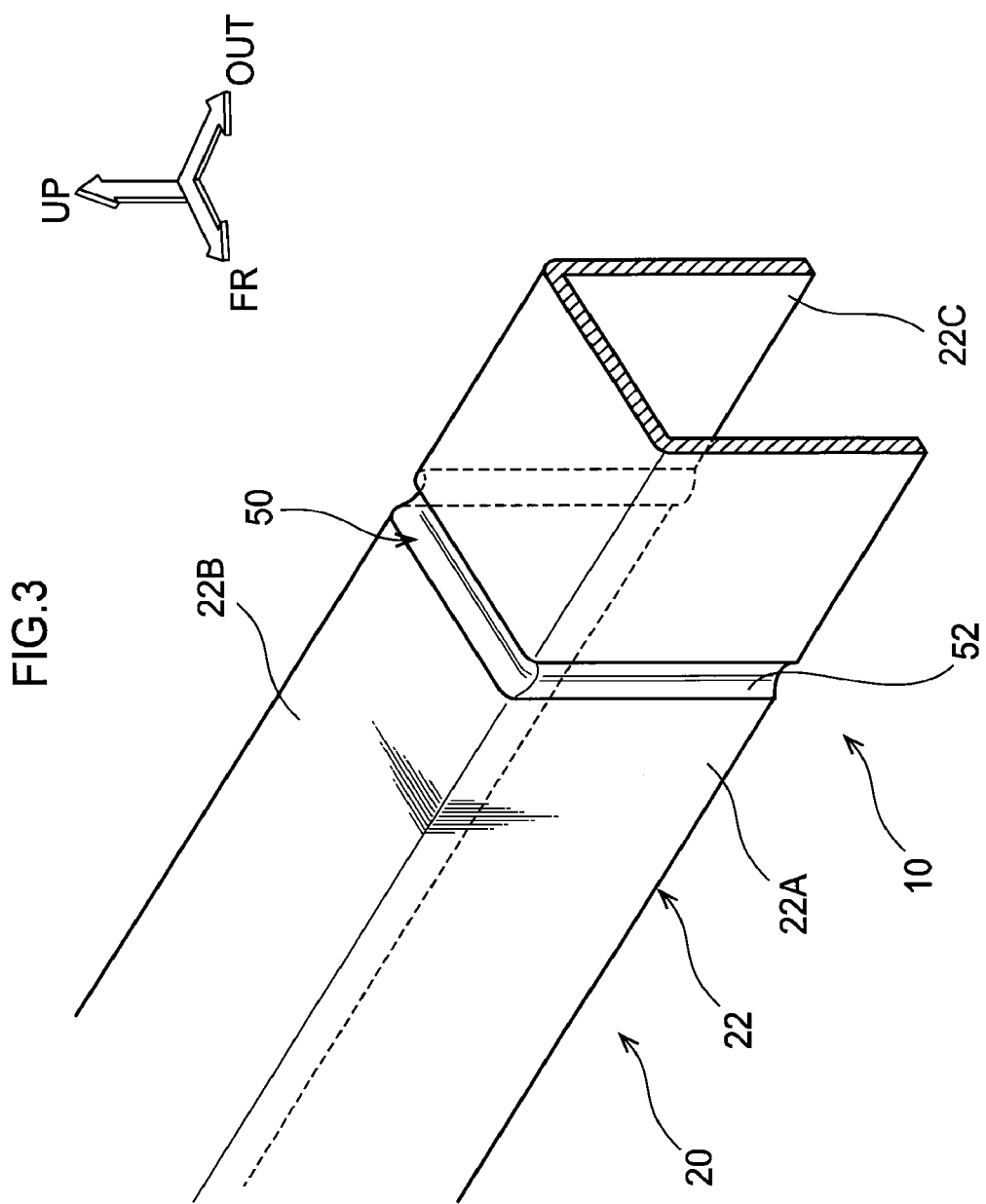
FIG. 3 is a perspective view showing a weak portion of the vehicle front portion structure pertaining to the first embodiment.

Specifically, as shown in FIG. 1 and FIG. 3, the weak portion 50 is a recessed bead portion 52 (a thin-walled portion) having a cross-sectionally substantially semicircular arc shape and formed spanning the front wall 22A, the upper wall 22B, and the rear wall 22C on the vehicle width direction outside of the vehicle width direction central portion of the front cross member 22 and on the vehicle width direction inside of the inner wall 32C of the front side coupling portion 32. Additionally, the recessed bead portion 52 becomes broken by a load input from the vehicle body front side.

Consequently, it suffices for the recessed bead portion 52 serving as the weak portion 50 to be formed at least in the front wall 22A to which the load is directly input. Furthermore, the weak portion 50 may also, for example, be a raised bead portion (a thin-walled portion) having a cross-sectionally substantially semicircular arc shape not shown in the drawings, provided that the front cross member 22 is configured in such a way as to become broken by a load input from the vehicle body front side.

Next, the action of the vehicle front portion structure 10 having the above configuration will be described.

As shown in FIG. 4, when the vehicle 12 is involved in a small overlap crash in which the vehicle 12 frontally crashes into a barrier W on the vehicle width outside of a pair of right and left front side members (not shown in the drawings) that extend in the vehicle body front and rear direction on the front portion side of the vehicle 12, the front end portion of the front wheel 38 crashes into the barrier W and a load F1 heading from the vehicle body front side toward the vehicle body rear side is input to the front wheel 38.

When this happens, a load F2 heading toward the vehicle body rear side is input to the lower arm 40 to which the front wheel 38 is attached, and the front side arm 42 of the lower arm 40 moves toward the vehicle body rear side. When the front side arm 42 moves toward the vehicle body rear side, a load becomes input via the front side coupling portion 32 to the vehicle width direction outside end portion of the front cross member 22 from the vehicle body front side, and the recessed bead portion 52 serving as the weak portion 50 becomes broken.

Because of this, rotation of the lower arm 40 toward the vehicle body rear side about the rear side coupling portion 34 is suppressed compared to a configuration where the lower arm 40 becomes detached from the front side coupling portion 32. That is to say, toe out, in which the rear portion side of the front wheel 38 turns inward in the vehicle width direction, is suppressed. Consequently, the front portion side of the front wheel 38 becomes pushed toward the vehicle body rear side relative to the barrier W so that, as shown in FIG. 5, the rear portion side of the front wheel 38 collides with the front end portion of the rocker 30.

When this happens, a reaction force F3 heading toward the vehicle body front side is relatively input by the rocker 30, so a load in the reverse direction relatively in the vehicle body front and rear direction is input between the joint portion 14 of the lower arm 40 and the front wheel 38. Because of this, the ball joint 16 in the joint portion 14 becomes detached from the recess portion 18A of the knuckle arm 18 and it becomes easier for the front wheel 38 to become detached at an early stage from the lower arm 40. Additionally, the front wheel 38 detached from the lower arm 40 is moved (turned) outward in the vehicle width direction of the vehicle 12.

In this way, when a load is input from the vehicle body front side to the front wheel 38 due to a small overlap crash of the vehicle 12, during the initial stage of the crash (at an early stage) the front wheel 38 can be detached from the lower arm 40 outward in the vehicle width direction. Thus, during the later stage of the crash, transmission of the load from the front wheel 38 to the rocker 30 can be suppressed or prevented, and the front wheel 38 can be prevented from approaching the cabin side. That is to say, the crash safety performance of the vehicle 12 with respect to vehicle occupants can be improved.

It should be noted that because the recessed bead portion 52 serving as the weak portion 50 is formed at least in the front wall 22A of the front cross member 22, it is easier for the recessed bead portion 52 to be broken compared to a configuration where the recessed bead portion 52 is not formed in the front wall 22A to which the load is input directly from the vehicle body front side. Furthermore, because the weak portion 50 is the recessed bead portion 52, the breaking thereof can be effectively promoted with a simple structure.

Second Embodiment

Next, the vehicle front portion structure 10 pertaining to a second embodiment will be described. It should be noted that the same reference signs will be assigned to parts that are the same as those in the first embodiment and detailed description (also including shared action) of those parts will be appropriately omitted.

Figure 6:
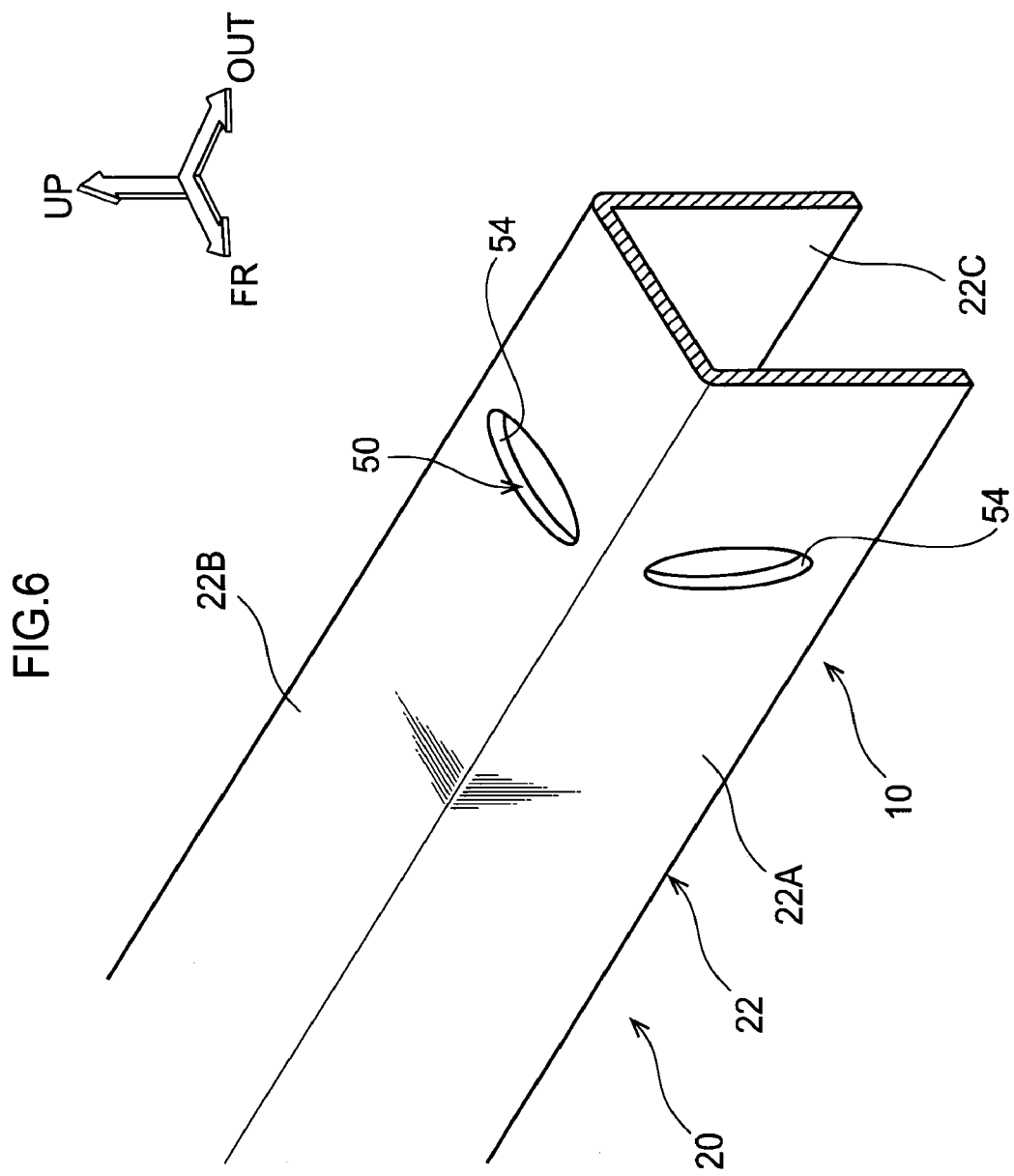
FIG. 6 is a perspective view showing the weak portion of the vehicle front portion structure pertaining to a second embodiment.

As shown in FIG. 6, in the second embodiment, the weak portion 50 is configured by open portions 54 (through holes). Specifically, substantially elliptical open portions 54 whose lengthwise direction coincides with the peripheral direction of the front cross member 22 are formed in the front wall 22A, the upper wall 22B, and the rear wall 22C of the front cross member 22 in the same position in the vehicle width direction (in one row in the peripheral direction).

Even when the vehicle front portion structure 10 is given this configuration, when a load is input from the vehicle body front side, the weak portion 50 can be made easier to break, and the breaking of the weak portion 50 can be effectively promoted with a simple structure. It should be noted that, like in the first embodiment, it suffices for the open portion 54 serving as the weak portion 50 to be formed at least in the front wall 22A of the front cross member 22.

Third Embodiment

Next, the vehicle front portion structure 10 pertaining to a third embodiment will be described. It should be noted that the same reference signs will be assigned to parts that are the same as those in the first embodiment and detailed description (also including shared action) of those parts will be appropriately omitted.

Figure 7:
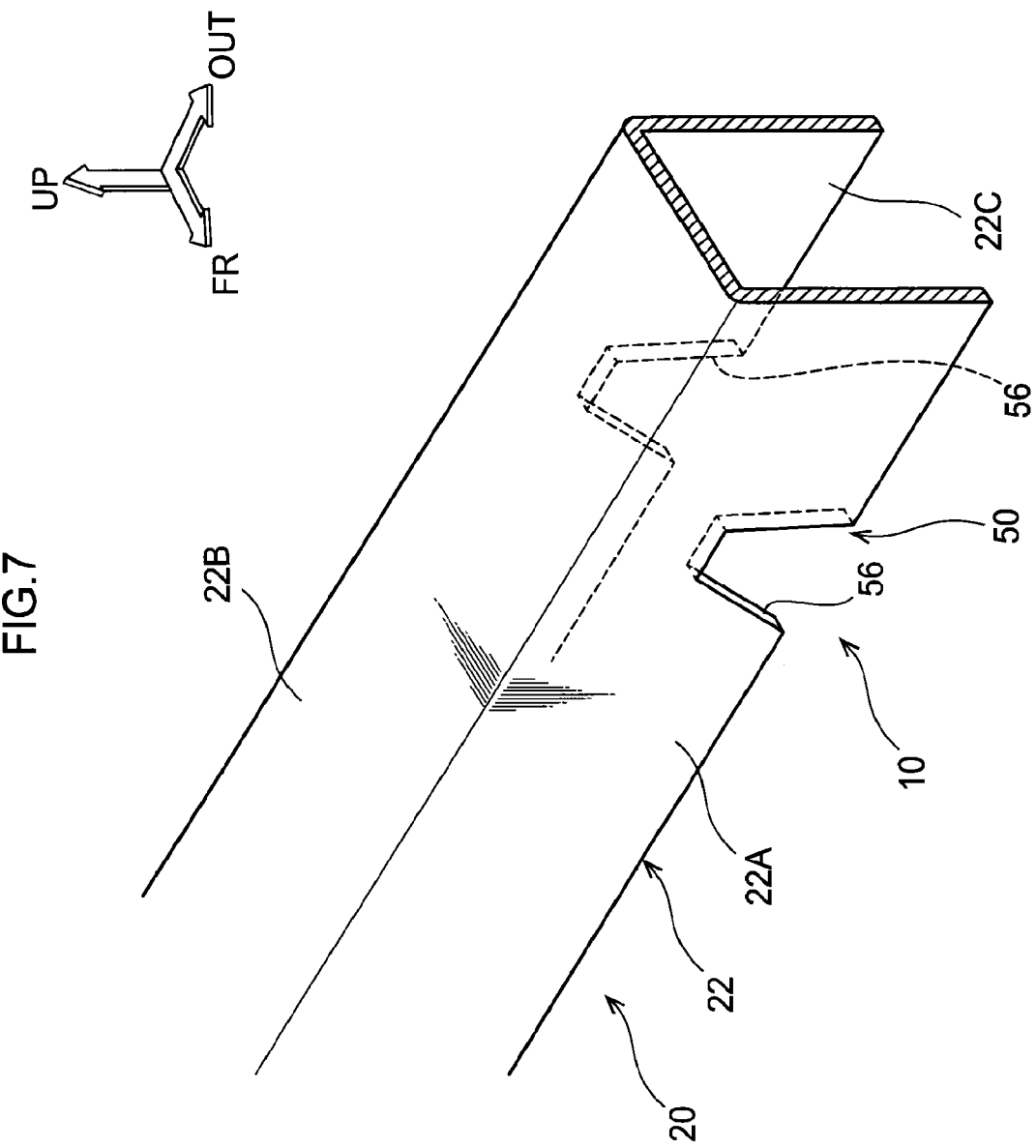
FIG. 7 is a perspective view showing the weak portion of the vehicle front portion structure pertaining to a third embodiment.

As shown in FIG. 7, in the third embodiment, the weak portion 50 is configured by cutout portions 56. Specifically, the cutout portions 56, each of which has a substantially isosceles trapezoidal shape as seen from the vehicle body front and rear direction, are formed in the lower end portion of the front wall 22A and the lower end portion of the rear wall 22C of the front cross member 22 in the same position in the vehicle width direction.

Even when the vehicle front portion structure 10 is given this configuration, when a load is input from the vehicle body front side, the weak portion 50 can be made easier to break, and the breaking of the weak portion 50 can be effectively promoted with a simple structure. It should be noted that, like in the first embodiment, it suffices for the cutout portion 56 serving as the weak portion 50 to be formed at least in the front wall 22A of the front cross member 22.

Fourth Embodiment

Next, the vehicle front portion structure 10 pertaining to a fourth embodiment will be described. It should be noted that the same reference signs will be assigned to parts that are the same as those in the first embodiment and detailed description (also including shared action) of those parts will be appropriately omitted.

Figure 8:
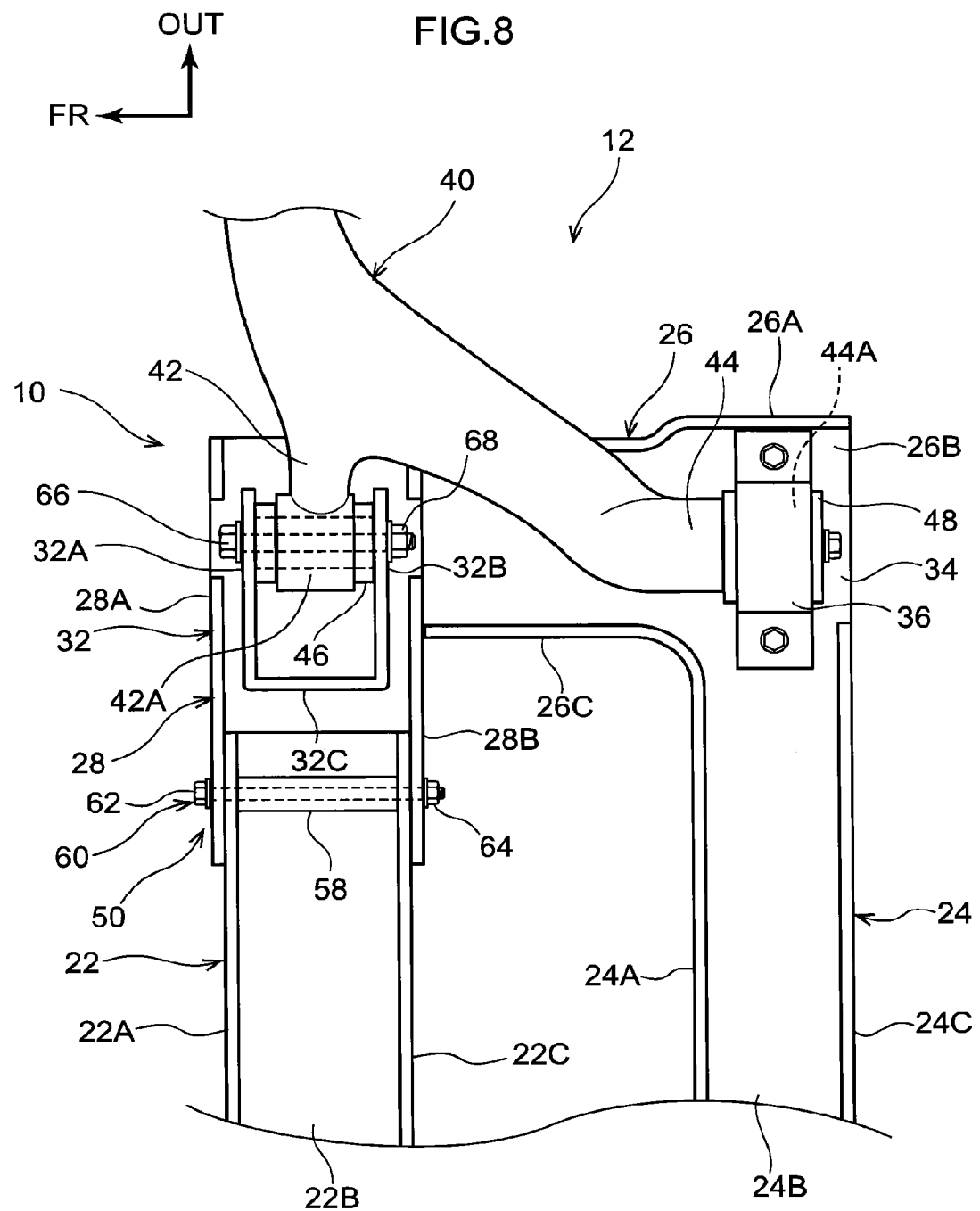
FIG. 8 is a bottom view showing the configuration of the weak portion of the vehicle front portion structure pertaining to a fourth embodiment.

FIG. 8 is a bottom view of the vehicle body left side, and FIG. 9 is a perspective view of the vehicle body right side. As shown in FIG. 8 and FIG. 9, in the fourth embodiment, the weak portion 50 is configured by making the coupling strength with which the vehicle width direction outside end portion of the front cross member 22 and the side rail 26 are coupled to each other smaller than the coupling strength with which the lower arm 40 is coupled to the front side coupling portion 32.

Specifically, a projecting portion 28 that extends inward in the vehicle width direction and has a cross-sectionally substantially inverted U-shape that opens downward is integrally formed on the front end portion of the side rail 26 of the suspension member 20 in the fourth embodiment. Additionally, the vehicle width direction outside end portion of the front cross member 22 is inserted from inside in the vehicle width direction into the projecting portion 28.

Through holes 28C running in the vehicle body front and rear direction are formed in a front wall 28A and a rear wall 28B of the projecting portion 28, and through holes 22D running in the vehicle body front and rear direction are also formed in the front wall 22A and the rear wall 22C in the vehicle width direction outside end portion of the front cross member 22. Additionally, a hollow cylinder-like collar member 58 is disposed coaxially with the through holes 22D inside the vehicle width direction outside end portion of the front cross member 22.

Consequently, the side rail 26 (the extension portion 28) and the vehicle width direction outside end portion of the front cross member 22 are fastened to each other as a result of the vehicle width direction outside end portion of the front cross member 22 being inserted into the projecting portion 28 of the side rail 26 and a bolt 62 being passed from the vehicle body front side through the through hole 28C in the front wall 28A, the through hole 22D in the front wall 22A, a through hole (not shown in the drawings) in the collar member 58, the through hole 22D in the rear wall 22C, and the through hole 28C in the rear wall 28B and screwed into a nut 64.

Additionally, the strength (coupling strength) with which a fastened portion 60 (coupling point) resulting from the bolt 62 and the nut 64 resists shearing force outward in the vehicle width direction is smaller than the strength (coupling strength) with which the front side coupling portion 32 resists shearing force outward in the vehicle width direction. Specifically, the diameter of the bolt 62 in the fastened portion 60 is smaller than the diameter of the bolt 66 in the front side coupling portion 32, so the coupling strength in the fastened portion 60 is configured to be weaker than the coupling strength in the front side coupling portion 32.

Consequently, when a load is input from the vehicle body front side due to a small overlap crash of the vehicle 12, the fastened portion 60 (the weak portion 50) becomes broken before the front side coupling portion 32. Specifically, the vehicle width direction insides of the front wall 28A and the rear wall 28B of the projecting portion 28 are broken by the bolt 62 from the through holes 28C. In this way, even when the weak portion 50 is configured by the fastened portion 60 whose coupling strength is weak, the weak portion 50 can be made easier to break, and the breaking of the weak portion 50 can be effectively promoted.

The vehicle front portion structure 10 pertaining to the embodiments has been described above on the basis of the drawings, but the vehicle front portion structure 10 pertaining to the embodiments is not limited to what is shown in the drawings and can undergo appropriate design changes without departing from the spirit of the present disclosure. For example, it suffices for the vehicle width direction inside of the lower arm 40 to fork at least into the front side arm 42 and the rear side arm 44.

Furthermore, the weak portion 50 is not limited to the recessed bead portion 52, the open portion 54, the cutout portion 56, and the fastened portion 60 shown in the drawings. It suffices for the weak portion 50 to have a structure that can make it easier to break the front side member 22 and can effectively promote the breaking thereof when a load is input from the vehicle body front side to the vehicle width direction outside end portion of the front side member 22 such as, for example, when the vehicle 12 is involved in a small overlap crash.

Furthermore, the front side coupling portion 32 may also be given a configuration in which it does not have the inner wall 32C. Moreover, the vehicle front portion structure 10 pertaining to the embodiments has been described as being formed in such a way as to be bilaterally symmetrical, but it is alright if the vehicle front portion structure 10 is not formed in such a way as to be bilaterally symmetrical. That is, the vehicle front portion structure 10 may also be given a configuration where the weak portion 50 is formed in only the vehicle body left side end portion or the vehicle body right side end portion of the front cross member 22.

What is claimed is:

1. A vehicle front portion structure comprising:
   a suspension member having
      a front cross member and a rear cross member that extend in a vehicle width direction and
      a side rail that extends in a vehicle body front and rear direction and couples a vehicle width direction outside end portion of the front cross member and a vehicle width direction outside end portion of the rear cross member to each other;
   a lower arm whose vehicle width direction outside end portion is coupled to a front wheel and whose vehicle width direction inside end portion is coupled at least to a front side coupling portion and a rear side coupling portion of the suspension member; and
   a weak portion that is formed in the front cross member on the vehicle width direction inside of a coupling point at which the lower arm and the front side coupling portion are coupled to each other and that is to be broken by a load input from the vehicle body front side.

2. The vehicle front portion structure according to claim 1, wherein the weak portion is formed at least in a front wall of the front cross member that faces the vehicle body front side.

3. The vehicle front portion structure according to claim 1, wherein the weak portion is a recessed bead portion.

4. The vehicle front portion structure according to claim 1, wherein the weak portion is an open portion.

5. The vehicle front portion structure according to claim 1, wherein the weak portion is a cutout portion.

6. The vehicle front portion structure according to claim 1, wherein the weak portion is configured by making the coupling strength with which the vehicle width direction outside end portion of the front cross member and the side rail are coupled to each other smaller than the coupling strength with which the lower arm is coupled to the front side coupling portion.

* * * * *